United States Patent
Tsukamoto

(10) Patent No.: US 7,108,166 B2
(45) Date of Patent: *Sep. 19, 2006

(54) METHOD FOR SEALING A BATTERY CASE

(75) Inventor: Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 10/367,217

(22) Filed: Feb. 13, 2003

(65) Prior Publication Data
US 2003/0121952 A1 Jul. 3, 2003

Related U.S. Application Data

(63) Continuation of application No. 09/421,171, filed on Oct. 19, 1999, now Pat. No. 6,554,178.

(51) Int. Cl.
H01M 10/04 (2006.01)

(52) U.S. Cl. ............... 228/122.1; 228/124.6

(58) Field of Classification Search ............ 228/122.1, 228/124.6, 124.5; 429/181, 176, 175, 177; 29/623.4, 623.1
See application file for complete search history.

(56) References Cited

U.S. PATENT DOCUMENTS

| | | | |
|---|---|---|---|
| 3,443,306 A | 5/1969 | Meyer |
| 3,600,017 A | 8/1971 | Scherer |
| 3,646,405 A | 2/1972 | Wallis et al. |
| 3,733,686 A | 5/1973 | Maucher |
| 4,213,558 A | 7/1980 | Hirobe et al. |
| 4,352,714 A | 10/1982 | Patterson et al. |
| 4,372,038 A | 2/1983 | Goebel |
| 4,479,168 A | 10/1984 | Green, Jr. |
| 4,532,489 A | 7/1985 | Phillips |
| 4,538,212 A | 8/1985 | Montgomery |
| 4,690,480 A | 9/1987 | Snow et al. |
| 4,831,708 A | 5/1989 | Yoshiwara et al. |
| 4,966,748 A | 10/1990 | Miyasaka et al. |
| 5,001,299 A | 3/1991 | Hingorany |
| 5,041,019 A | 8/1991 | Sharp et al. |
| 5,109,594 A | 5/1992 | Sharp et al. |
| 5,110,307 A | 5/1992 | Rapoza |
| 5,250,845 A | 10/1993 | Runyan |
| 5,298,683 A | 3/1994 | Taylor |

(Continued)

FOREIGN PATENT DOCUMENTS

EP 0228983 A2 7/1987

(Continued)

OTHER PUBLICATIONS

U.S. Appl. No. 60/126,514, filed Mar. 26, 1999 to Malmgren et al.

(Continued)

*Primary Examiner*—Len Tran
(74) *Attorney, Agent, or Firm*—Gavrilovich, Dodd & Lindsey

(57) ABSTRACT

This invention is an improved method for making a battery case feedthrough. It utilizes stainless steel or titanium metal clad with aluminum. The use of the clad metal enables the fabrication of the battery case and cover and feedthrough pin assembly where a high temperature ceramic-metal hermetic seal is needed between a stainless steel feedthrough pin and a ceramic insulator; and between a ceramic insulator and a surrounding hollow cylinder. A high temperature hermetic seal is also used to fasten the feedthrough pin assembly to the upper stainless steel part of the stainless steel-aluminum clad cover. Titanium can be substituted for stainless steel. Lower temperature metal-metal hermetic seals are needed between the aluminum-clad part of the cover and the aluminum battery casing.

30 Claims, 2 Drawing Sheets

U.S. PATENT DOCUMENTS

| | | | |
|---|---|---|---|
| 5,397,661 | A | 3/1995 | Kaun |
| 5,405,272 | A | 4/1995 | Rapoza |
| 5,433,260 | A | 7/1995 | Taylor |
| 5,500,026 | A | 3/1996 | Heller et al. |
| 5,535,097 | A | 7/1996 | Ruben et al. |
| 5,675,122 | A | 10/1997 | Taylor |
| 5,701,758 | A | 12/1997 | Haramoto et al. |
| 5,727,313 | A | 3/1998 | Paterek et al. |
| 5,811,206 | A | 9/1998 | Sunderland et al. |
| 6,071,557 | A | 6/2000 | Haraguchi et al. |
| 6,090,503 | A | 7/2000 | Taylor et al. |
| 6,127,064 | A | 10/2000 | Shibata et al. |
| 6,132,900 | A | 10/2000 | Yoshizawa et al. |
| 2002/0192559 | A1 | 12/2002 | Yoshimura et al. |

FOREIGN PATENT DOCUMENTS

| | | |
|---|---|---|
| EP | 0 522 687 B1 | 3/1997 |
| JP | 59154747 A | 9/1984 |
| JP | 61088984 A2 | 5/1986 |
| JP | 63239764 A | 1/1989 |
| JP | 02022831 A2 | 1/1990 |
| JP | 04055066 A2 | 2/1992 |
| JP | 04081288 A2 | 3/1992 |
| JP | 06234083 A2 | 8/1994 |
| JP | 07-124755 | 5/1995 |
| JP | 08-332540 A2 | 12/1996 |
| JP | 09076076 A2 | 3/1997 |
| JP | 09-155561 A2 | 6/1997 |
| JP | 09-174243 A2 | 7/1997 |
| JP | 10-208777 A2 | 8/1998 |
| WO | WO 00/24542 A1 | 5/2000 |
| WO | WO 02/03483 A1 | 1/2002 |

OTHER PUBLICATIONS

U.S. Appl. No. 60/126,531, filed Mar. 26, 1999 to Schulman et al.

Written Opinion, dated Mar. 25, 2002, received in relation to Application No. PCT/US01/20598.

International Preliminary Examination Report, dated Aug. 6, 2002, received in relation to Application No. PCT/US01/20598.

Invitation to Pay Additional Fees and Communication Relating to the Results of the Partial International Search dated Apr. 28, 2004, in International Application PCT/US02/3064, International Filing Date Sep. 26, 2002.

International Search Report from International Application No. PCT/US02/30664 (Applicant: Quallion LLC).

METHOD FOR SEALING A BATTERY CASE

CROSS-REFERENCE TO RELATED APPLICATIONS

This is a Continuation of application Ser. No. 09/421,171 filed Oct. 19, 1999, now U.S. Pat. No. 6,554,178, which is a Divisional of application Ser. No. 09/290,012, filed Apr. 8, 1999, now abandoned.

FIELD OF THE INVENTION

This invention relates to battery case feedthroughs. It also relates to clad metals. Also it relates to high temperature ceramic-metal hermetic seals and to lower temperature metal-metal hermetic seals.

BACKGROUND OF THE INVENTION

There are different methods for forming clad metal, such as a plate of stainless steel clad with aluminum. In one method (U.S. Pat. No. 4,213,558, Hirobe, et al.), sheet metal cladding is fed onto one or both faces of the hot solidified continuously cast strip being withdrawn from the casting means and the assembly is then passed to a hot roll bonding system for cladding. Another method (U.S. Pat. No. 4,966,748, Miyasaka et al.) produces a clad metal by forming a layer of dissimilar metal powder on the surface of a base metal by cold fixing the powder to the surface under pressure, densing only the surface and a subsurface area of the layer of the dissimilar metal powder by melting and immediately solidifying in a vacuum, compressing the layer of the dissimilar metal powder together with the base metal at a temperature not higher than the solidus-line temperature of the two dissimilar metals under a pressure of not lower than 300 kgf/cm2 using a hot isostatic press, and hot working the layer of the dissimilar metal powder together with the base metal.

Ceramic to stainless steel and ceramic to titanium bonds are particular examples of ceramic to metal bonds. Braze bonding, for example, aluminum oxide and zirconium oxide ceramics to metals, including titanium, stainless steel, molybdenum, tantalum, and cobalt-chromium alloys, can be done using a braze, comprising 30% nickel and 70% titanium (U.S. provisional Patent Application, Ser. No, 60/126,531; PCT Application WO00/56677). Another example of a braze bond includes the preferred method for joining zirconium oxide containing 3% yttrium to preferably a metal alloy, namely, titanium and niobium (55% Ti and 45% Nb), using the nickel-titanium braze (50% Ni and 50% Ti) (U.S. Provisional Patent Application, Ser. No. 60/126,514; PCT Application WO00/56395).

How can a high temperature brazing operation for joining metal and ceramic be made compatible with the further low temperature joining of two metal surfaces, these two metal surfaces having a relatively low melting temperature?

SUMMARY OF THE INVENTION

This invention makes use of clad metals in order to provide high temperature and low temperature seals. For example, stainless steel and aluminum can form a hermetically bonded clad combination. The stainless steel or titanium can be used with a high temperature braze in order to form a hermetic seal bond with a ceramic material such as aluminum oxide or zirconium oxide.

The method of use of this for battery feedthroughs is the placement of a stainless steel or titanium pin through a cylinder of ceramic, such as aluminum oxide or zirconium oxide. This ceramic is surrounded by on annular cylinder of stainless steel or titanium. A hole is formed in an aluminum clad stainless-steel sheet, with the stainless steel forming the upper layer. A high temperature welding process, for example, hermetically bonds the upper stainless-steel layer to the outer stainless steel cylinder of the feedthrough assembly. The lower aluminum layer is easily laser welded to the battery case cover of aluminum. If the clad metal was not used, the high temperature used to embed the central stainless-steel feedthrough pin in the ceramic cylinder, would destroy the aluminum battery casing and cover.

BRIEF DESCRIPTION OF THE DRAWINGS

The above and other features and advantages of the invention will be more apparent from the following detailed description wherein.

DETAILED DESCRIPTION OF THE PREFERRED EMBODIMENT

Figure 1:
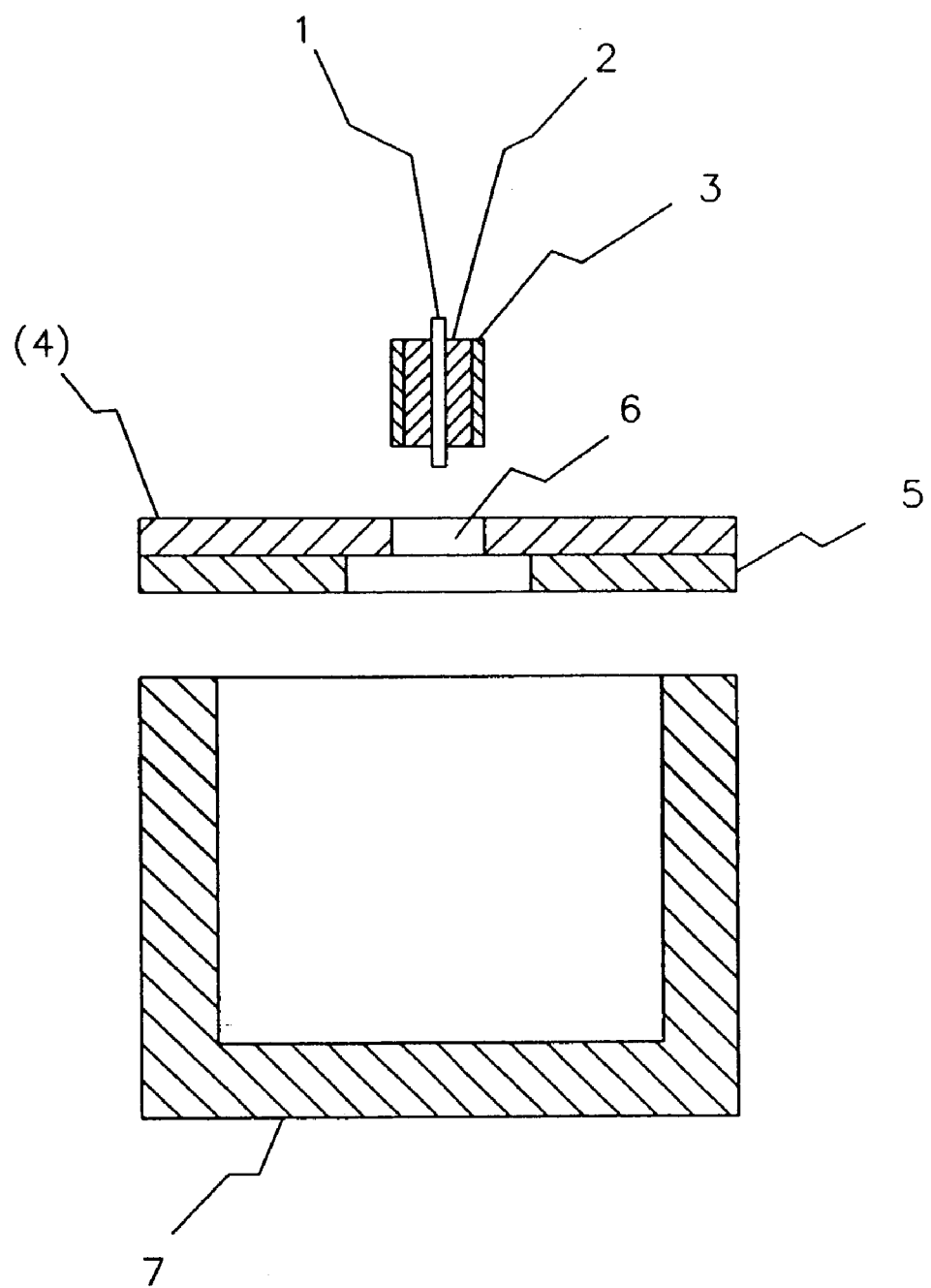
FIG. 1 shows an exploded view of the feedthrough for the battery casing with aluminum clad stainless steel (or titanium) material.

The following description is of the best mode presently contemplated for carrying out the invention. This description is not to be taken in a limiting sense, but is merely made for the purpose of describing the general principles of the invention. The scope of the invention should be determined with reference to the claims.

This invention makes use of clad metals in order to provide high temperature and low temperature seals. For example, stainless steel, and titanium, can form an hermetically bonded clad combination with aluminum. The stainless steel or titanium can be used with a high temperature braze in order to form a hermetic seal bond with a ceramic material such as aluminum oxide or zirconium oxide. The method of use of this for battery feedthroughs is that of the baking in, or brazing in, of a stainless steel or titanium pin (1) in a cylinder of ceramic (2), such as aluminum oxide or zirconium oxide. This ceramic is surrounded by on annular cylinder (3) of stainless steel or titanium. The cylindrical combination of metal feedthrough pin, ceramic insulator, and metal surrounding cylinder allows for welding the stainless steel, or titanium, outer cylinder, hermetically, to the upper part of a stainless steel, or titanium, sheet (4), aluminum clad (5), with a hole (6) prepared in it. The upper part of said clad sheet is stainless steel (or titanium) (4), the lower part is aluminum (5), and the lower sheet can be hermetically welded to an aluminum case (7), for example, an aluminum battery case.

Figure 2:
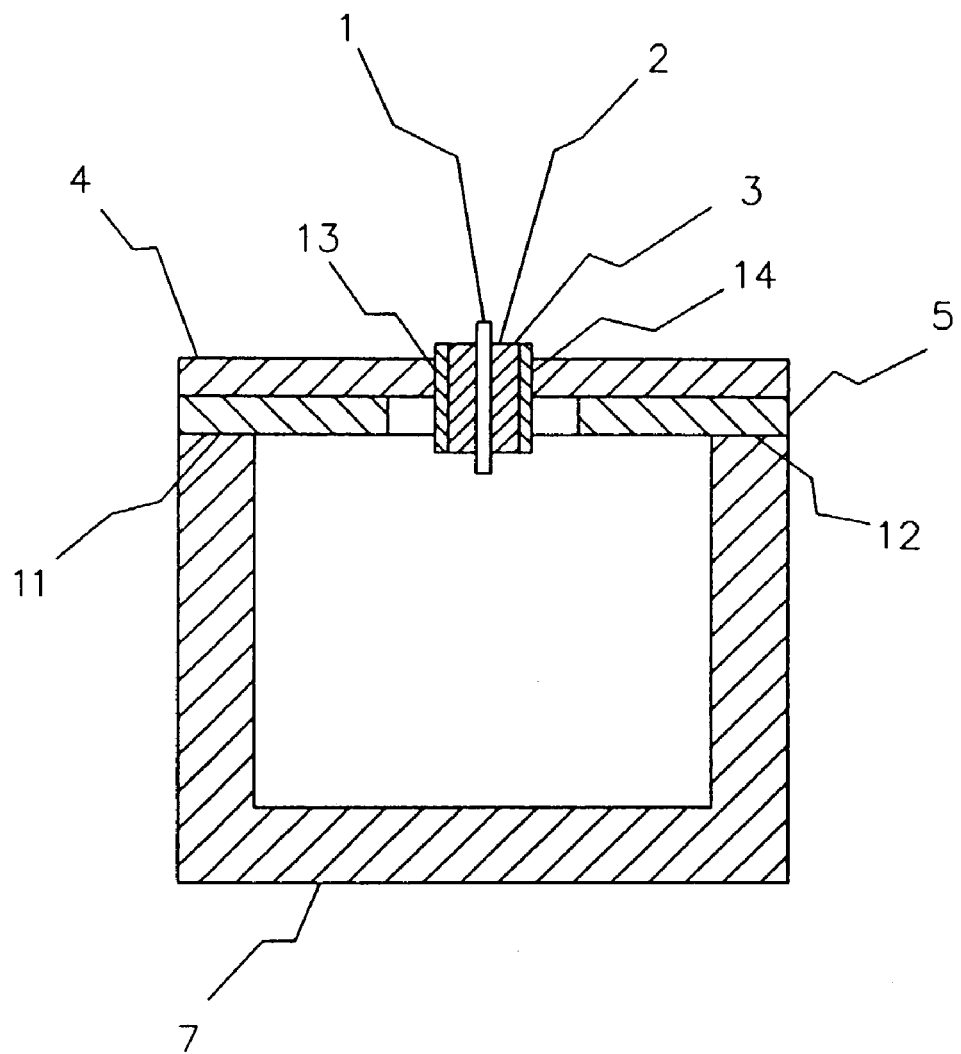
FIG. 2 shows a non-exploded view of FIG. 2.

If the clad metal were not used, the high temperature used to hermetically bond the feedthrough pin assembly (stainless-steel feedthrough pin, ceramic cylinder, outer stainless-steel cylinder) would require a stainless steel cover with which to bond the assembly. However, in trying to bond the stainless-steel cover to the aluminum case, the welding, or brazing, temperature would melt the aluminum. The melting point temperatures of the metals are aluminum 660.37° C., stainless steel-303, 1427° C., and titanium 1660+/−10° C. In FIG. 2, Low temperature hermetic welds are shown at (11) and (12). High temperature welds are shown at (13) and (14)

While the invention herein disclosed has been described by means of specific embodiments and applications thereof, numerous modifications and variations could be made thereto by those skilled in the art without departing from the scope of the invention set forth in the claims.

What is claimed is:

1. A method for sealing a battery case, comprising:
    providing a battery case that includes a first low melting point metal;
    providing a cover that includes a sheet of a first high melting point metal hermetically clad with a second low melting point metal, a hole extending through the sheet;
    providing a feedthrough having an insulator between a pin and an annulus, the annulus including a second high melting point metal;
    hermetically joining the second high melting point metal of the annulus to the first high melting point metal of the cover such that the pin is positioned in the hole; and
    hermetically attaching the first low melting point metal of the battery case to the second low melting point metal of the cover.

2. The method of claim 1, wherein providing the cover includes
    bonding the second low melting point metal to the first high melting point metal using pressure and heat; and
    preparing the through the clad sheet.

3. The method of claim 2, wherein bonding includes
    feeding sheet metal cladding onto at least one face of a strip to form an assembly; and;
    passing the assembly to a hot roll bonding system for cladding.

4. The method of claim 3, wherein feeding the sheet metal cladding onto at least one face of the strip includes feeding sheet metal cladding onto both faces of the strip.

5. The method of claim 2, wherein preparing the hole through the clad sheet includes preparing a stepped hole through the clad sheet.

6. The method of claim 1, wherein providing the feedthrough includes:
    hermetically sealing the pin to the insulator; and
    hermetically sealing the insulator to the annulus.

7. The method of claim 6, wherein hermetically sealing the pin to the insulator includes baking in a stainless steel or titanium pin in the insulator.

8. The method of claim 6, wherein joining the second high melting point metal of the annulus to the first high melting point metal of the cover includes using heat to join the second high melting point metal to the first high melting point metal.

9. The method of claim 1, wherein joining the second high melting point metal of the annulus to the first high melting point metal of the cover includes welding.

10. The method of claim 1, wherein attaching the first low melting point metal the second low melting point metal includes welding.

11. The method of claim 1, wherein joining the second high melting point metal of the annulus to the first high melting point metal of the cover includes high temperature welding and wherein attaching the first low melting point metal the second low melting point metal includes low temperature welding.

12. The method of claim 1, wherein:
    the first and second low melting point metals include aluminum; and
    the first and second high melting point metals include titanium.

13. The method of claim 1, wherein:
    the first and second low melting point metals include aluminum; and
    the first and second high melting point metals include stainless steel.

14. A method for sealing a battery case, comprising:
    providing a battery case that includes a first low melting point metal;
    providing a cover that includes a sheet of a first high melting point metal hermetically clad with a second low melting point metal, a stepped hole extending through the sheet;
    providing a cover that includes a sheet of a first high melting point metal hermetically clad with a second low melting point metal, a hole extending through the sheet;
    providing a feedthrough having a second high melting point metal;
    hermetically joining the second high melting point metal of the feedthrough to the first high melting point metal of the cover such that the feedthrough is positioned in the hole; and
    hermetically attaching the first low melting point metal of the battery case to the second low melting point metal of the cover.

15. The method of claim 14, wherein providing the cover includes bonding the second low melting point metal to the first high melting point metal using pressure and heat; and
    preparing the through the clad sheet.

16. The method of claim 15, wherein bonding includes feeding sheet metal cladding onto at least one face of a strip to form an assembly; and;
    passing the assembly to a hot roll bonding system for cladding.

17. The method the claim 16, wherein feeding the sheet metal cladding onto at least one face of the strip includes feeding sheet metal cladding onto both faces of the strip.

18. The method of claim 14, wherein providing the feedthrough includes:
    placing a conductive pin through an insulator;
    hermetically sealing the pin to the insulator; and
    hermetically sealing the insulator to an annulus.

19. The method of claim 18, wherein hermetically sealing the pin to the insulator includes baking in a stainless steel or titanium pin in the insulator.

20. The method of claim 18, wherein joining the second high melting point metal of the feedthrough to the first high melting point metal of the cover includes using heat to join the second high melting point metal to the first high melting point metal.

21. The method of claim 14, wherein joining the second high melting point metal of the feedthrough to the first high melting point metal of the cover includes welding.

22. The method of claim 14, wherein attaching the first low melting point metal the second low melting point metal includes welding.

23. The method of claim 14, wherein joining the second high melting point metal of the feedthrough to the first high melting point metal of the cover includes high temperature welding and wherein attaching the first low melting point metal the second low melting point metal includes low temperature welding.

24. The method of claim 14, wherein:
    the first and second low melting point metals include aluminum; and
    the first and second high melting point metals include titanium.

25. The method of claim 14, wherein:
the first and second low melting point metals include aluminum; and
the first and second high melting point metals include stainless steel.

26. The method of claim 1, wherein:
the insulator is a ceramic cylinder.

27. The method of claim 1, wherein:
the insulator surrounds the pin.

28. The method of claim 1, wherein:
the hole through the sheet is stepped such that the second low melting point metal is spaced apart from the feedthrough after the second high melting point metal is joined to the first high melting point metal.

29. The method of claim 1, wherein:
hermetically joining the second high melting point metal of the feedthrough to the first high melting point metal of the cover is performed before hermetically attaching the fist low melting point metal of the battery case to the second low melting point metal of the cover.

30. The method of claim 14, wherein:
the hole through the sheet is stepped such that the second low melting point metal is spaced apart from the feedthrough after the second high melting point metal is joined to the first high melting point metal.

* * * * *